Patented Feb. 1, 1955

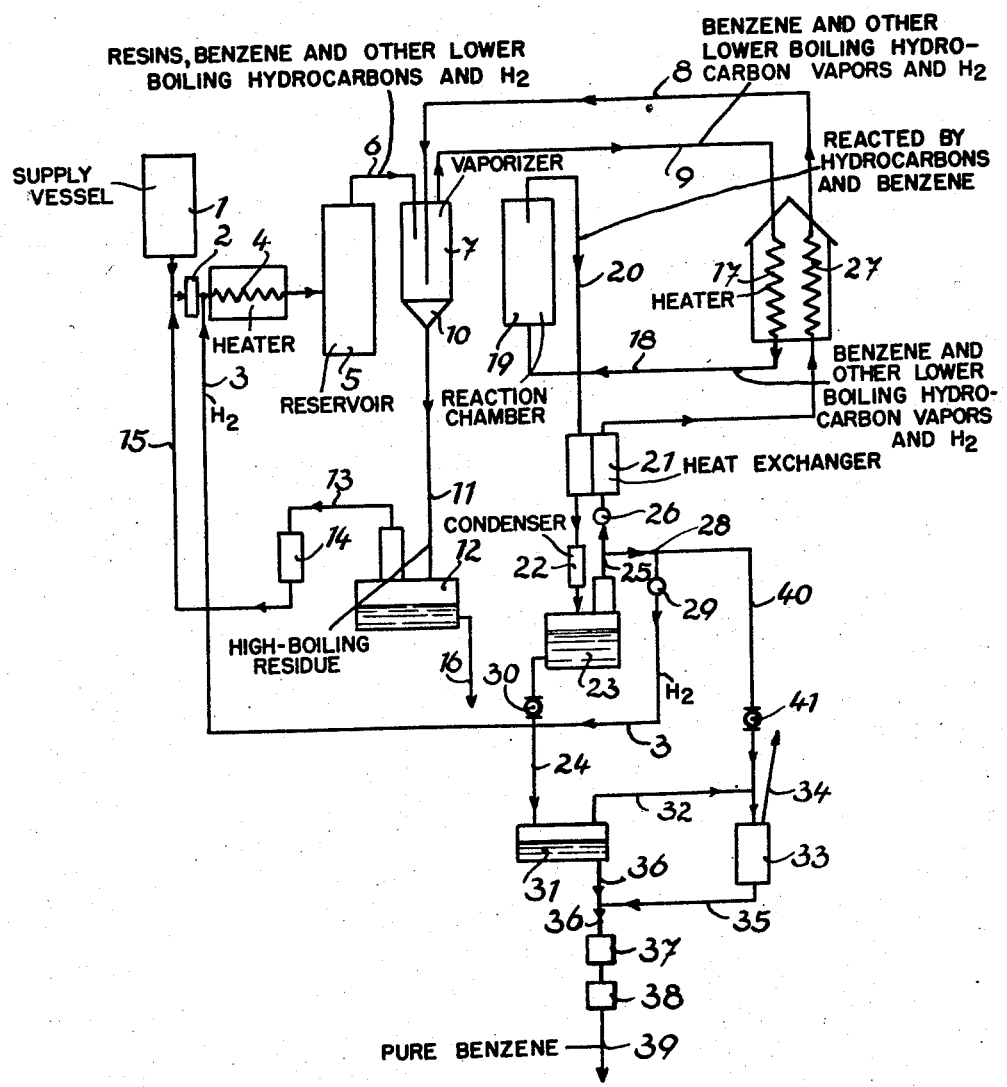

2,701,267

PROCESS FOR REFINING OILS CONTAINING BENZENE AND/OR BENZENE HYDROCARBONS

Wilhelm Urban and Hermann Stärker, Gelsenkirchen, Germany, assignors to Scholven-Chemie Aktiengesellschaft, Gelsenkirchen-Buer, Germany Application November 20, 1950, Serial No. 196,568

Claims priority, application Germany November 28, 1949

6 Claims. (Cl. 260—674)

The invention relates to the treatment with hydrogen of oils containing benzene and/or benzene hydrocarbons, especially crude benzene or benzene "first product" which is the material obtained by steam distillation of wash oil used in the recovery of light oils from gases, such as coal distillation gases and thereby enriched with benzene, and more specifically it relates to a catalytic treatment of such benzene or other material with hydrogen at elevated temperature and increased pressure, advantageously by continuous working and in the vapour phase, whereby certain substances, mainly unsaturated hydrocarbons and sulphur compounds, contained in the oil are converted or decomposed, respectively, by hydrogenation without substantially attacking chemically the benzene.

One object of the invention is to provide for such improvements in the treatment with hydrogen of the initial material that the loss in valuable hydrocarbons is substantially entirely removed or is reduced to an unimportant level.

Another object of the invention is to increase the "life" of the catalysts employed in the catalytic treatment of the initial material with hydrogen.

Further objects of the invention will be apparent from the following description of the process in accordance with the invention, by reference to the accompanying drawing, which illustrates schematically an apparatus for carrying out the process according to the present invention.

Crude benzene obtained from coal tar, and the so-called benzene "first product" which is obtained by distillation from the enriched wash oil serving for the removal of benzene and homologues from gases, especially coal distillation gas, as well as other hydrocarbon oils, have hitherto usually been refined by a treatment with acid, especially sulphuric acid, and subsequent alkali washing. By this method, however, there are considerable losses in valuable hydrocarbons, due to the formation of emulsions, resins and sulphates.

It has further been proposed to subject crude benzene or benzene "first product" to a catalytic treatment with hydrogen or gases containing or giving off hydrogen, such treatment being carried out at elevated temperature and increased pressure. In this manner, there is obtained a clear product which is free from unsaturated compounds and which is also free from certain sulphur compounds (thiophene), and from which it is possible to obtain, by rectification or other means, pure benzene as well as a small amount of valuable low-boiling hydrocarbons.

Although the losses in this latter process may in themselves be small, the process has not hitherto been used technically. In subsequent tests, it has been shown that the efficiency of the catalyst under these conditions is lowered with unexpected rapidity and consequently the catalyst employed has to be frequently renewed or exchanged.

The harmful effect on the efficiency of the catalyst is related to the fact that the resinous substances, which are formed by polymerization, are deposited during the further treatment of the initial material on the surface of the catalyst in the form of a more or less impervious coating, so that the catalyst cannot, or can no longer sufficiently, influence the reaction of the hydrogen.

It has therefore already been proposed to free the benzene from the resinous impurities before the catalytic treatment, at normal or increased pressure and at temperatures up to 450° C., e. g. by a treatment with Florida earth or fuller's earth, or with dilute sulphuric acid. However, such a preliminary treatment is troublesome and expensive.

The present invention is characterized in the feature that, before the catalytic treatment of the benzene or the like with hydrogen, the starting material is subjected to a heat treatment in the liquid phase at temperatures above 150° C., but below the cracking temperature of the substances, especially the polymers that are formed by such heat treatment, and at increased pressure, said heat treatment being of such duration that the polymerizable substances are polymerized to higher boiling compounds, at least to the extent that the polymerizable substances remaining unchanged cannot disturb the catalysts during the hydrogen treatment which follows, and that the said compounds, upon vaporization of the lower boiling substances of the material are separated as residue, advantageously as liquid residue.

It has been proved that by such a technically simple heat treatment of the material in the liquid phase at relatively low temperature, but of fairly long duration, the polymerizable impurities can be almost completely removed, whereby the efficiency of the catalyst used for the subsequent catalytic treatment is so considerably improved that this method of refining benzene or the like is superior economically to any other known benzene-refining process. Even working continuously, there is obtained, by the use of the invention, a pure product, e. g. pure benzene, of exceptional properties which have not hitherto been obtainable technically.

In order to ensure the complete conversion of the polymerizable impurities of the starting material into higher molecular compounds, capable of being almost completely separated from the other hydrocarbons by distillation, as by forming a residue, it is advantageous, in accordance with the invention, to carry out the heating of the starting material to the temperature of the catalytic treatment in such a manner that the material remains for a relatively long time approximately in the temperature range of 180–300° C., preferably 200–250° C., and in a pressure range such that polymerization proceeds with adequate speed but reconversion or cracking of the higher molecular compounds being formed does not take place. Thereafter the higher molecular impurities are separated and finally the material is heated to the temperature of the catalytic treatment which is to follow. According to the invention, the material can remain for about one half to one hour, and even longer, in the said temperature and pressure range without further substantial supply of external heat.

After completion of the polymerization reactions, the material can conveniently be vaporized in a further step by expansion, or by further supply of heat, advantageously by introducing hot hydrogen as carrier, so that the high-molecular compounds formed by polymerization remain as a residue. The vaporized material, in the vapor phase, is then brought into contact with the catalyst if necessary after further heating.

The vaporization is advantageously carried to such an extent that a proportion of low boiling constituents still remains in the residue, since the residue can then be extracted from the vaporizer in liquid form. The residue is then separately distilled and the low-boiling condensate that results therefrom is combined with the starting material and re-introduced to the process.

The heating of the starting material to the temperature of the polymerization reactions is also advantageously carried out in the presence of a certain quantity of hydrogen, which is supplied, optionally together with the starting material, through a continuously operated tube heater. The hydrogen is advantageously freed from the vapor-like hydrocarbons contained therein by cooling or in other suitable manner and is recycled.

The refining of the benzene or the like by the process of the invention, and optionally also the associated preliminary treatment of the starting material, are advantageously carried out continuously tubular heaters (through which the material flows in a continuous stream) being used for the heating of the substances.

These tubular heaters may be combined with vessels of such volume that the material flowing through these vessels remains therein for the desired period of time, e. g. in such a manner that the material enters the vessel at the bottom and leaves it at the top.

The refining proper takes place in the vapor phase in a manner known per se preferably, immediately after the preliminary treatment and in a continuous process in a high pressure vessel in the presence of sufficient quantities of hydrogen and catalysts preferably arranged on or supported by suitable carrying means such as perforated plates or the like in such a manner that the vaporous mixture to be treated may flow along the surface of siad catalysts and are brought into intimate contact therewith accordingly.

In the arrangement shown in the drawing for carrying the invention into effect in continuous operation, the hydrocarbon oil to be refined, e. g. crude benzene, comes from the supply vessel 1 to a pump 2, which delivers it at such a pressure to the succeeding apparatus 4 that the reactions can be carried out at a pressure of 20–200 atm., preferably 50–100 atm.

After the pump 2, the material may be mixed with a small quantity of hydrogen from the pipe 3. The mixture then passes into the heater 4, in which it is heated to a temperature between 180° C. and 300° C., preferably to a temperature of 200–250° C. The heated material then passes into a reservoir 5, the dimensions and design of which are such that the material remains in it for about ½ to 2 hours without substantial change in temperature.

Thereupon, the material flows through the pipe 6 into the vaporising vessel 7, into which hydrogen at about 350° C. is also introduced from the pipe 8. The term "hydrogen" as used in this specification and the following claims is intended to include pure hydrogen or gases containing hydrogen, for instance coal distillation gases.

Due to the additional supply of heat, evaporation takes place in the vessel 7. The vaporized substances escape through the pipe 9, whilst a high-boiling residue collects in the, preferably conical, bottom portion 10 of the evaporator 7. This residue also may contain a certain quantity of lower boiling substances so that it remains sufficiently liquid. It is drawn off through the pipe 11 into a distillation still 12 in which the lower boiling constituents are distilled off. The vapours escaping through the pipe 13 are condensed in the condenser 14 and added again to the starting material via the pipe 15 leading to pump 2.

The pitch-like residue collecting in the still 12 may be removed in liquid form through the pipe 16.

The mixture of hydrocarbon vapors and hydrogen escaping from the evaporator 7 passes through pipe 9 to a gas-fired indirect heater 17 in which its temperature is raised to about 340° C. It then passes through the pipe 18 into the reaction chamber 19, in which it is brought into contact in the vapor phase with known catalysts, e. g. the oxides or sulphides of the 5th, 6th and 8th group of the periodic table of the elements, if necessary supported on solid carriers. The gases and vapors leave the reaction chamber 19 through the pipe 20 and pass into a heat exchanger 21 and thence into a condenser 22, where the hydrocarbons capable of condensing are separated out. The latter are collected in the vessel 23 and can be drawn off in liquid form through the pipe 24 after expansion by valve 30. The gases leave through the pipe 25 and are partly moved by a pump 26 via the heat exchanger 21 to the gas-fired heater 27, from which they again pass to the evaporator 7 via the pipe 8.

A part stream of the gas is forced by the pump 29 out of the pipe 28 and into the pipe 3, in order to be mixed with the starting material before entry into the heater 4.

The treated benzene or the like drawn off through the pipe 24 is separated in the container 31 from the gases dissolved in it, said gases escaping through the pipe 32 to an absorption vessel 33, in which the last remains of the hydrocarbon oils are retained. The gases are finally led off through the pipe 34 to be used for other purposes, for example, as heating gas for the heaters 17 and 27.

The hydrocarbon oil separated out in the absorption vessel 33 passes from the latter through the pipe 35 to the discharge pipe 36 of the container 31. The hydrocarbon oil then passes into the alkali washer 37 and finally into the water washer 38, which it leaves at 39 in pure form.

A part of the gas is continuously or intermittently withdrawn from the gas circulation into the absorption vessel 33 via the pipe 40 and the expansion device 41, in order to keep the concentration of the hydrogen in circulation at a suitable value.

Fresh hydrogen is introduced into the system at a suitable point, for example, into the pipe 25.

The treatment of crude benzene may, for example, be carried out in the following manner:

In a continuous manner, 8 metric tons crude benzene are heated to 230° C. in the heater 4 together with 3000 cubic metres of coke oven gas (about 50% $H_2$) per hour at a pressure of 100 atm. The heated material remains in the vessel 5 at a substantially constant temperature (about 230° C.) for about 45 minutes. It then flows continuously into the evaporator 7, into which there is introduced hourly, at suitable pressure, 13,000 cubic metres of coke oven gas or circulation gas, which has been heated to 350° C. in the heater 27.

At the bottom of the evaporator, the high-molecular substances formed by polymerization are drawn off, which substances after distilling off the low-boiling material entrained therewith, may amount to about 0.5% (by weight), based on the starting material. This pitch-like residue is then drawn off through the pipe 16.

The mixture of benzenous vapor and hydrogen is then heated to about 340° C. in the heater 17. A molybdic acid-zinc oxide-catalyst or a molybdic acid-alumina-catalyst is employed in the reaction chamber 19.

The benzene condensed in the condenser 22, after expansion and separating out of the gases dissolved therein, is further washed with a weak alkali lye in order to remove any hydrogen sulphide which still remains, and then is finally washed with water.

The benzene resulting at 39 contains less than 1% non-aromatic parts. A benzene having a very high degree of purity is obtained with a high yield of up to 99.0%. The bromine number of this pure benzene is less than 0.2, the sulphuric acid test is below 0.1 and the sulphur content is practically nil.

Various changes may be carried out in performing the process according to the invention without departing from the scope of the claims hereinafter made.

We claim:

1. A process for the recovery of benzene and other hydrocarbons from oils containing benzene contaminated with unsaturated hydrocarbons and sulfur compounds, a portion of the contaminants being polymerizable when the oil is heated to form resinous, higher boiling substances, said process comprising the steps of heating said oil in the liquid phase at superatmospheric pressure and at a temperature above 150° C. and below the cracking temperature of substantially all of the higher boiling substances formed in the heating treatment, said heating being continued until the resin-forming contaminants are converted into resinous compounds of higher boiling point than benzene, thereafter vaporizing benzene and homologues and other lower boiling constituents from the oil, while the polymerisates formed still remain in the liquid phase, and reacting the vapors obtained with hydrogen at an elevated temperature and superatmospheric pressure in the presence of a catalyst for hydrogenating unsaturated hydrocarbons and sulfur compounds contained in the vapors being treated and thereafter separating benzene and other hydrocarbons from the reaction gases and catalyst.

2. The process of claim 1 wherein the initial heating of the benzene-containing oil for removal of resin-forming contaminants is carried out at a temperature between 180 and 300° C.

3. The process of claim 1 wherein the initial heating of the benzene-containing oil for removal of resin-forming contaminants is carried out at a temperature between 200 and 250° C.

4. The process of claim 1, wherein the oil treated is that obtained by steam distillation of wash oil used in the treatment of coal distillation gases.

5. A process for the recovery of benzene and other hydrocarbons from oils containing benzene contaminated with unsaturated hydrocarbons and sulfur compounds a portion of the contaminants being polymerizable when the oil is heated to form resinous, higher boiling substances, said process comprising the steps of heating said oil in the liquid phase at superatmospheric pressure and at a temperature above 150° C. and below the cracking temperature of substantially all of the higher boiling substances formed in the heating treatment, flowing the heated oil continuously through at least two closed vessels connected in series while maintaining the temperature of said oil substantially unchanged at a velocity such that the resin-forming contaminants are converted into resinous compounds of higher boiling point than benzene, thereafter vaporizing benzene and homologues and other lower boiling constituents from the oil, while the polymerisates formed still remain in the liquid phase, and reacting the vapors obtained with hydrogen at an elevated temperature and superatmospheric pressure in the presence of a catalyst for hydrogenating unsaturated hydrocarbons and sulfur compounds contained in the vapors being treated and thereafter separating benzene and other hydrocarbons from the reaction gases and catalyst.

6. A process for the recovery of benzene and other hydrocarbons from oils containing benzene contaminated with unsaturated hydrocarbons and sulfur compounds, a portion of the contaminants being polymerizable when the oil is heated to form resinous, higher boiling substances, said process comprising the steps of heating said oil in the liquid phase at superatmospheric pressure and at a temperature above 150° C. and below the cracking temperature of substantially all of the higher boiling substances formed in the heating treatment, said heating being continued until the resin-forming contaminants are converted into resinous compounds of higher boiling point than benzene, thereafter vaporizing benzene and homologues and other lower boiling constituents from the oil by treating them with hot hydrogen, while the polymerisates formed still remain in the liquid phase, and reacting the vapors obtained with hydrogen at an elevated temperature and superatmospheric pressure in the presence of a catalyst for hydrogenating unsaturated hydrocarbons and sulfur compounds contained in the vapors being treated and thereafter separating benzene and other hydrocarbons from the reaction gases and catalyst.

References Cited in the file of this patent

UNITED STATES PATENTS

| | | |
|---|---|---|
| 1,441,341 | Govers | Jan. 9, 1923 |
| 1,932,365 | Krauch et al. | Oct. 24, 1933 |
| 2,143,036 | Smith et al. | Jan. 10, 1939 |
| 2,222,128 | Wagner | Nov. 19, 1940 |

OTHER REFERENCES

Whitehead, Benzol, Benn Bros. Ltd., London, England (1920), page 132.

Fieser and Fieser Organic Chemistry, Heath and Company, Boston, Mass., 1944, page 527.